Oct. 28, 1941.   D. S. BOND ET AL   2,260,931
CONSTANT FREQUENCY POWER SUPPLY SYSTEM
Filed Nov. 30, 1939
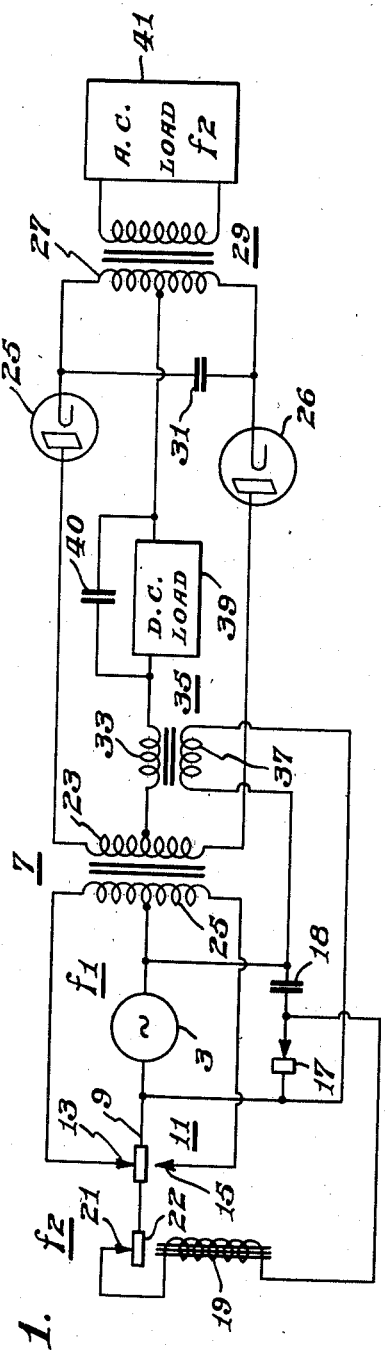
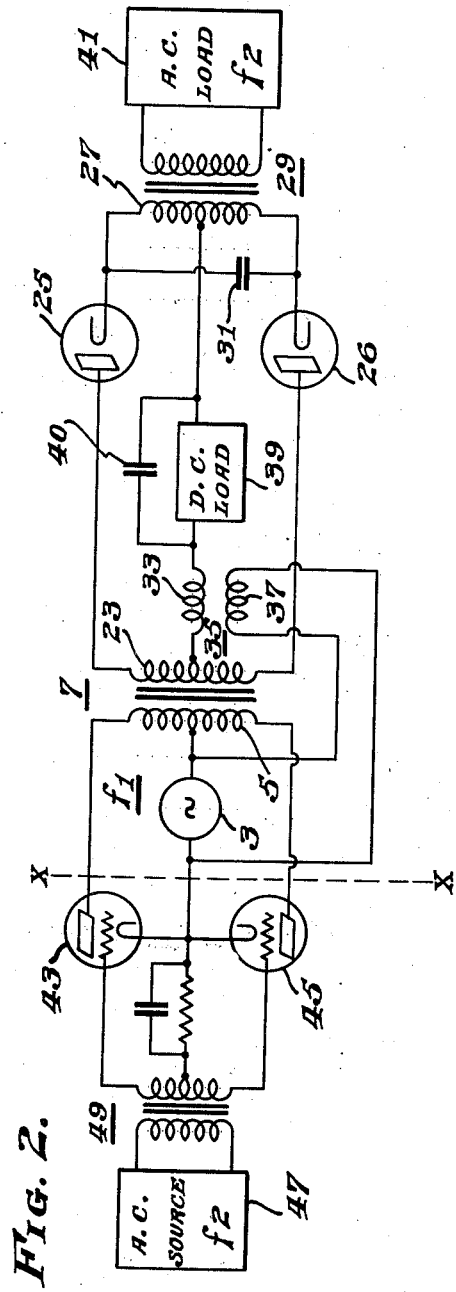
INVENTORS
Donald S. Bond
Francis L. Moseley
BY
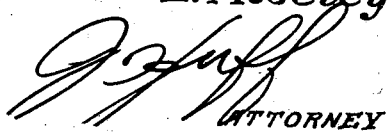
ATTORNEY Patented Oct. 28, 1941

2,260,931

UNITED STATES PATENT OFFICE 2,260,931

CONSTANT FREQUENCY POWER SUPPLY SYSTEM

Donald S. Bond, Philadelphia, Pa., and Francis L. Moseley, Chevy Chase, Md.; said Bond assignor to Radio Corporation of America, a corporation of Delaware, and said Moseley assignor to Sperry Gyroscope Company, Inc., Brooklyn, N. Y., a corporation of New York Application November 30, 1939, Serial No. 306,838

7 Claims. (Cl. 171—97)

This invention relates to an improved method of and means for providing electrical power of constant frequency, and more particularly to an improved power supply system of the type described in a copending application of D. S. Bond, Serial No. 305,783, filed November 24, 1939, for "Constant frequency power supply systems."

In the above identified copending application, a low cost, light weight device is described by means of which a constant frequency alternating current and a direct current are obtained from a prime source of power whose frequency bears no particular relation to the frequency of the derived alternating current. This result is accomplished by interrupting or modulating the current from the prime generator at a fixed rate by means of a vibrator, for example. The resultant side band voltages are stepped up to the desired level and rectified to produce modulation frequency components and a direct voltage. Negligible power is required to modulate the currents from the prime generator, but power is delivered at the modulation frequency, or a harmonic thereof.

In the earlier arrangement, the entire current output of the prime generator is modulated or interrupted by the vibrator. Where the current is large, some difficulty may be experienced as a result of sparking at the vibrator contacts. It is the principal object of this invention, therefore, to provide an improved power supply system in which only a part of the current from the prime generator is interrupted. Other objects of this invention include the provision of an improved method of and means for deriving constant frequency alternating current from a power source whose frequency is unrelated to the derived constant frequency; the provision of an improved power converter in which a constant frequency alternating current is derived from a source of power whose frequency is variable; and the provision of an improved arrangement for deriving an alternating current of constant frequency from a source of power of unrelated frequency in response to a control derived from a source of small power output. Other objects of this invention, as well as a better understanding of its nature and operation, will be apparent from the following detailed description when considered in connection with the accompanying drawing, and its scope is indicated by the appended claims.

Referring to the drawing, Figure 1 is the circuit diagram of an embodiment of this invention and Figure 2 is the circuit diagram of a modification thereof. Similar reference numerals refer to similar parts throughout the drawing.

In Fig. 1, reference numeral 3 indicates an alternating current generator which is the prime source of energy. The frequency of this generator is assumed to be uncontrolled and subject to substantial variations from time to time. Further, it is assumed that the frequency of this generator is different from the desired output frequency. It may be 800 cycles per second, for example, where the desired output frequency is, say, 100 cycles per second. One terminal of the generator 3 is connected to the mid-point of the primary 5 of a step-up transformer 7. The other terminal of the generator 3 is connected to the movable arm 9 of a vibrating type single pole-double throw switch 11. The two fixed contact points 13 and 15 of the switch 11 are connected, respectively, to the outer terminals of the transformer primary 5. A small rectifier 17 of the copper-oxide type and a capacitor 18 are connected in series across the generator terminals and provide a direct current for energizing an electromagnet 19. The energizing circuit is completed through a third contact point 21 which co-operates with a contact 22 on the movable arm 9.

The outer terminals of the secondary winding 23 of the step-up transformer 7 are connected to the anode electrodes of a pair of rectifiers 25 and 26. The primary 27 of an output transformer 29 is connected between the cathode electrodes of the two rectifiers. A capacitor 31 is connected across the primary 27 to tune it to resonance at the desired output frequency. Between the center tap of the output transformer primary 27 and the center tap of the step-up transformer secondary 23 are serially connected the secondary 33 of a coupling transformer 35 and a D. C. load device 39 which is by-passed for alternating currents by a capacitor 40. The secondary 33 preferably has a low D. C. resistance. The primary 37 of the coupling transformer 35 is connected to the prime generator terminals.

The operation of the device illustrated in Fig. 1 will now be explained. The currents from the prime generator 3 having a frequency $f_1$ may be considered as carrier frequency currents which are modulated at the frequency $f_2$ and alternately reversed in phase by the action of the vibrator 11. As a result, side band frequencies $f_1+f_2$ and $f_1-f_2$ are produced in the secondary circuit. When the circuit is completely balanced, the carrier frequency $f_1$ will be suppressed as in the case of a balanced modulator, the similarity of which will be recognized. The side band currents are recombined with carrier frequency currents induced in the common cathode circuit by the transformer 35. For best results, the amplitude of the induced carrier frequency is of the order of the amplitude of the vector sum of the side band currents. The coupling transformer 35, therefore, preferably has a step-up ratio similar to that of the transformer 7. Upon demodulation by the two rectifiers 25 and 26, the side bands recombine with the carrier to produce a current of vibrator frequency f2 and a direct current. The alternating current is by-passed around the direct current load device 39 and is available at the secondary of the output transformer 29.

The direct current load device 39 is, for example, the radio receiver with which the device is to be used. The alternating current load device 41 is any device which requires a source of constant frequency current. In the case of left-right course indicating receivers for aircraft, this alternating voltage may be used to drive the mechanical or electronic switching devices which are required, as is well known.

It is to be noted that a substantial portion of the available power output is derived from the carrier frequency source through transformer 35 without passing through the vibrator contacts. This reduces the sparking at the vibrator contacts and allows a greater output to be drawn from a given vibrator. The arrangement described in the above identified copending Bond application did not provide for the insertion of carrier frequency currents in the secondary circuit and, as a result, the frequency of the output was twice that of the vibrator. In the present case, however, the output frequency is equal to the vibrator frequency. In both cases, the output frequency is absolutely independent of the frequency of the prime generator 3, although all the output power is derived therefrom.

In certain instances, it has been found that a source of alternating current of small power output is available, and it is desired to operate therefrom a device which consumes substantial power at that frequency, and at the same time it is necessary to provide a direct current of suitable amplitude to operate a radio receiver, or the like. Assuming the available power source is an alternating frequency generator whose frequency is subject to fluctuations, the modification illustrated in Fig. 2 is a convenient arrangement for obtaining both direct current and alternating current of the desired frequency from the prime generator.

That portion of Fig. 2 to the right of the dotted vertical line X—X is identical to the corresponding portion of Fig. 1, and need not be described again. The vibrator 11 of Fig. 1, however, has been replaced by a pair of triodes 43 and 45 whose anode electrodes are connected to the primary 5 of transformer 7, and whose grid electrodes are coupled in push-pull relation to the source of alternating current 47, through a coupling transformer 49.

As before, currents from the prime generator are modulated at the frequency f2, but since only a portion of the available energy is passed by the keying triodes 43 and 45, the power handling ability of the system is increased over that of a system in which all the current from the prime generator is required to be modulated.

It is to be noted that the system illustrated in Fig. 2 is also useful when the frequency of the alternating current source 47 is variable. In such a case, the output frequency will follow the input frequency, and yet the power for both the A. C. and D. C. output circuits is derived from the prime generator whose frequency may be varying at the same time.

While we have described two particular arrangements of our invention, it is to be understood that other modifications may be made without departing from the spirit of our invention. Thus, the vibrator may be of the type which will operate directly from the alternating current derived from the prime generator, or any other available source. In certain cases, it may be possible to use copper oxide rectifiers in place of the diode rectifiers illustrated.

We claim as our invention:

1. A device for obtaining constant frequency currents from a source of current of uncontrolled frequency which includes means for periodically interrupting said currents of uncontrolled frequency at a constant rate, means for deriving combination frequency currents from said interrupted currents, means for combining said combination frequency currents with currents of said uncontrolled frequency to produce a resultant current, means for rectifying said resultant current, and means for deriving constant frequency currents from said rectified currents.

2. A device for obtaining constant frequency currents from a source of current of uncontrolled frequency which comprises means for periodically interrupting said currents of uncontrolled frequency at a constant rate, means for deriving combination frequency currents from said interrupted currents, means for combining said combination frequency currents with uninterrupted currents from said source to produce a resultant current, means for rectifying said resultant current, and means for deriving constant frequency currents and direct currents from said rectifying means.

3. A device of the character described which comprises a source of alternating currents of varying frequency, a transformer having primary and secondary windings, means for alternately connecting said source between a point intermediate the ends of said primary winding and one or the other of the ends of said primary winding, a rectifier connected to said secondary winding, means for combining currents in said secondary winding with uninterrupted currents of said varying frequency, and means for deriving direct current output from said rectifier.

4. A device of the character described which includes a prime power source, a transformer having primary and secondary windings, means for passing currents from said prime power source alternately in opposite directions through said primary winding, a pair of rectifiers having anode and cathode electrodes, said rectifiers having similar electrodes connected to respective ends of said secondary winding, a circuit including a coupling transformer secondary connected between a point intermediate the ends of said step-up transformer secondary winding, means for inducing uninterrupted currents from said power source into said coupling transformer secondary, and means for deriving from said rectifier a direct and a constant frequency alternating current whose frequency is unrelated to the frequency of said prime power source.

5. A device of the character described in claim 3 in which said means for alternately connecting said source between a point intermediate the ends of said primary winding and one or the other of the ends of said primary winding is a switching vibrator.

6. A device of the character described in claim 1 in which said means for periodically interrupting said currents of uncontrolled frequency at a constant rate is a switching vibrator.

7. A device of the character described in claim 1 in which said means for periodically interrupting said currents of uncontrolled frequency at a constant rate includes a pair of thermionic tubes whose control electrodes are varied in phase opposition at a constant frequency.

DONALD S. BOND.
FRANCIS L. MOSELEY.